(12) United States Patent
Hogan et al.

(10) Patent No.: US 6,846,412 B2
(45) Date of Patent: Jan. 25, 2005

(54) COMBINATION FILTER ASSEMBLY

(75) Inventors: Brendan Hogan, Limerick (IE); Jan Willem Marinus Myers, Venlo (NL)

(73) Assignee: BTG International Limited, London (GB)

( * ) Notice: Subject to any disclaimer, the term of this patent is extended or adjusted under 35 U.S.C. 154(b) by 37 days.

(21) Appl. No.: 10/166,162

(22) Filed: Jun. 10, 2002

(65) Prior Publication Data

US 2003/0070975 A1 Apr. 17, 2003

(30) Foreign Application Priority Data

Jun. 11, 2001 (DE) ..................................... 201 09 515 U
Aug. 14, 2001 (DE) ..................................... 201 12 986 U (51) Int. Cl.[7] .............................................. B01D 25/02
(52) U.S. Cl. ....................... 210/227; 210/231; 210/232; 210/335; 210/339; 210/445; 210/446; 210/451; 210/489; 264/DIG. 48
(58) Field of Search ................................ 210/767, 224, 210/227, 231, 232, 335, 339, 445, 446, 451, 489; 264/DIG. 48

(56) References Cited

U.S. PATENT DOCUMENTS

| | | | |
|---|---|---|---|
| 608,034 A | * | 7/1898 | Feroe .......................... 210/227 |
| 1,903,368 A | * | 4/1933 | Symons et al. ............. 210/227 |
| 3,386,580 A | | 6/1968 | Grabarczyk |
| 3,539,049 A | | 11/1970 | D'Eustachio et al. |
| 3,800,943 A | | 4/1974 | Riesbeck et al. |
| 4,199,442 A | | 4/1980 | Popow |
| 4,371,436 A | | 2/1983 | Farber |
| 5,453,184 A | * | 9/1995 | Handtmann ................. 210/193 |
| 5,556,541 A | | 9/1996 | Ruschke |
| 5,688,460 A | | 11/1997 | Ruschke |
| 6,168,653 B1 | | 1/2001 | Myers |

FOREIGN PATENT DOCUMENTS

| | | |
|---|---|---|
| DE | CH 53 771 | 12/1910 |
| DE | 2 023 357 A | 11/1970 |
| DE | 23 54 269 A | 7/1975 |
| DE | 34 17 248 A1 | 11/1985 |
| WO | WO 91/09660 A1 | 11/1991 |

* cited by examiner

*Primary Examiner*—Robert James Popovics
(74) *Attorney, Agent, or Firm*—Brinks Hofer Gilson & Lione (57) ABSTRACT

A combination filter assembly having a plurality of filter sieves positioned in parallel one after the other in the direction of flow. The filter sieves are stretched and mounted in housing elements to form filter elements. The housing elements are in contact with each other by means of top and bottom bearing faces, and are maintained in a stack. The filter elements have a cylindrical shape with annular bearing faces, wherein one bearing face includes a centering male coupling and sealing formation, and the other bearing face includes a corresponding centering female coupling and sealing formation.

43 Claims, 6 Drawing Sheets

COMBINATION FILTER ASSEMBLY

BACKGROUND OF THE INVENTION

The invention relates to a combination filter assembly having a number of filter elements that are arranged in parallel one after the other in the direction of flow, wherein each of the filter elements typically comprises a filter sieve that is stretched across and mounted to a housing element. The combination filter assembly is formed by stacking the housing elements one on top of the other.

Combination filter assemblies of this kind are generally known, and apart from other possible uses, are most often used in the cosmetic and pharmaceutic industry to produce a foam from chemical fluids. To this end, the chemical fluid is forced, by the pressure of an inert gas or air, through a combination filter assembly having two to four extremely fine filter sieves. The sieves are arranged in a parallel, stacked formation, and typically have an interior diameter of between 6 and 10 mm, with a mesh size in the range 40 and 50 Micron. The size of the bubbles of the foam produced by the filter is determined by the mesh size of the sieves.

The combination filter assembly typically consists of a cylindrical housing of plastic having an inlet section and an outlet section, wherein the cylindrical filter elements are stacked and inserted into the housing with their annular bearing faces contacting each other. This arrangement, however, has a number of disadvantages. For example, bypasses or leaks can occur between the individual filter sieves, thereby allowing the chemical fluid to bypass the filter sieves. This can result in the formation of a foam having uncontrolled and non-uniform sizes of bubbles, thereby producing a foam of reduced quality of the foam.

BRIEF SUMMARY OF THE INVENTION

The present invention is therefore directed to a combination filter assembly that overcomes the above-noted problems. In particular, the present invention provides an improved combination filter assembly that, in spite of a simple design of manufacture, excludes or at least reduces the bypass of fluids about the filter sieves, and to a suitable production method for manufacturing the filter assembly.

In a preferred embodiment of the present invention, the combination filter assembly comprises a plurality of filter elements wherein each filter element has a centering male coupling and sealing formation on either its top or bottom bearing face, and further has a corresponding centering female coupling and sealing formation on the other bearing face. The centering male and female coupling and sealing formations on each of the filter elements aligned these components with each other so as to insure an optimal flow path through the assembly. The centering male and female coupling and sealing formations also insure that the individual filter elements are in complete contact with each other so as to form an absolute seal about the filter sieve.

In a particularly preferred embodiment of the present invention, the male coupling and sealing formation consists of an annular protrusion on the top bearing face, and the female coupling and sealing formation consists of a corresponding annular groove in the bottom bearing face. The objects of the present invention are particularly achieved by these features, which are also simple and inexpensive to mold or manufacture.

In addition, the invention can be further achieved by the annular protrusion and the annular groove each having a V-shaped cross section. Such a cross section is of special advantage with respect to the centering effect as well as with respect to the tightness of the seal.

In another preferred embodiment of the present invention, the top bearing face has an annular lowered step, and the bottom bearing face has an annular boss fitting into said step, wherein the fit between the exterior diameter of the boss and the interior diameter of the step is a slight press fit. The male coupling and sealing formation is positioned on the top of the step and the female coupling and sealing formation is positioned on the corresponding top of the boss. In addition, the height of the boss is larger than the distance by which the step is lowered with respect to the top bearing face. These features permit the filter elements to be joined together prior to, or without the need for, a housing. In addition, the annular protrusion and the annular groove preferably have a V-shaped cross section in combination with the slight-press fit to further ensure an absolute tight fit at the transition between the individual filter elements. The tightness achieved between the individual filter elements is also improved as a result of the position of the coupling and sealing formations. In addition, these design element makes it possible to subject the column or stack of filter elements to an axial prestress, thereby further improving the tightness of the seals.

In addition, the invention can be further achieved by positioning the filter sieve over the annular protrusion in the corresponding housing element, and partly covering the cylindrical wall surrounding the step. This ensures that the filter sieves are safely and effectively held in their housing elements without the need for additional clamping.

Although the number of filter elements in a combination filter assembly according to the present invention is unlimited, for practical reasons it is preferred that the combination filter assembly contain two to five filter elements.

Further, it is preferred that the filter elements are positioned as a coaxial stack within a housing, that the filter elements are mounted in the housing with an axial load, that the housing consists of an entry section and exit section that are mountable to each other in an axial relation, and that the entry section comprises a female coupling and sealing formation while the exit section comprises a male coupling and sealing formation. These features have the added advantage that the entry section and the exit section can each be designed according to the demands of the customer and/or final user of the combination filter assembly, without the basic construction of the filter elements needing to be altered or changed. In addition, these features ensure that there are no leaks at the juncture between the entry section and the exit section.

Preferably, the entry section is connected with the exit section by ultrasonic welding or adhesion while maintaining the prestress in the column of filter elements. This is a relatively simple type of manufacture since the stacked column of sealing elements has been centered by the prestressing of the stacked column previous to the ultrasonic welding. In addition, the load generated by the prestressing can be maintained after the ultrasonic welding is completed.

In an alternative embodiment of the present invention, the entry section is connected with the exit section, while maintaining the prestress load in the column of filter elements, by a cylinder section produced by overmoulding of the two sections. Here, the column of filter elements is aligned by the centering coupling and sealing formations and prestressed between the exit section and the entry section, while the unit is then overmoulded to produce the cylinder section connecting the entry section with the exit section and enclosing the column of filter elements.

In this connection, the cylinder section may be produced from an artificial resin that shrinks after the overmoulding operation to produce an axial load in the column of filter elements. This has the possible advantage that the column of filter elements does not have to be prestressed between the entry section and the exit section during the overmoulding operation.

A further improvement in the tightness of the column of filter elements may also be achieved by choosing a wall thickness for the housing elements that permits the material thereof to be welded together with the material of the cylinder section during the overmoulding operation.

Preferably, the entry section comprises a female Luer-Lock-connector, and the exit section comprises a male Luer-Lock-connector.

A further object of the present invention is a method for producing a combination filter assembly of the type described above, and in which a number of filter sieves forming filter elements are stretched and mounted in housing elements, in which the filter sieves are positioned in a parallel relationship one after the other in the direction of flow, and in which the housing elements are stacked in a housing so as to contact each other on top and bottom bearing faces.

In a preferred method for producing a combination filter assembly, each filter element is provided with a centering male coupling and sealing formation on one of its bearing faces, and with a female coupling and sealing formation on its opposite bearing face. The filter elements with interengaging male and female sealing formations are then stacked in a column and positioned between an entry section and an exit section. The filter elements are then axially compressed, and while in this state, the entry section is connected with the exit section. Preferably, the entry section is connected with the exit section via a housing section by means of ultrasonic welding or adhesion.

In another preferred embodiment, the entry section is connected with the exit section by overmoulding. In this connection, it is especially preferred that the column of filter elements be positioned between the entry section and the exit section under pretension, and that the entry section be connected with the exit section by means of a cylinder section formed by overmoulding. It is preferable that the wall thicknesses and/or the injection moulding temperature be chosen such that the material of the cylinder section is melted together with the material of the filter elements or their housing elements during the overmoulding operation.

BRIEF DESCRIPTION OF SEVERAL VIEWS OF THE DRAWINGS

The above mentioned and other features and objects of this invention and the manner of attaining them will become more apparent and the invention itself will be best understood by reference to the following description of the invention taken in conjunction with the accompanying drawings wherein.

DETAILED DESCRIPTION OF THE INVENTION

For explaining the present invention, reference is made to the embodiment illustrated in FIGS. 1–6.

As shown in the drawings, the combination filter assembly 1 according to the present invention consists of a number of parallel filter screens 2 positioned one behind the other in the direction of flow. The filter screens 2 each form filter elements 4 by being extended across housing elements 6. The housing elements 6 are held in a stack arrangement by means of contacting top and bottom bearing faces 8 and 10. As shown, the filter elements 4 are generally of cylindrical shape such that the bearing faces 8 and 10 are annular.

Figure 1:
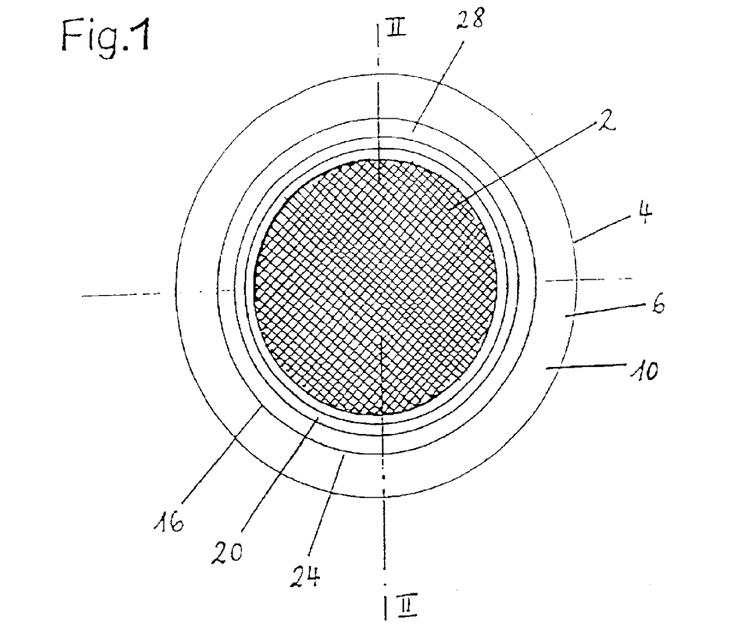
FIG. 1 is a front view of one of the filter elements of the combination filter assembly according to the present invention.
Figure 2:
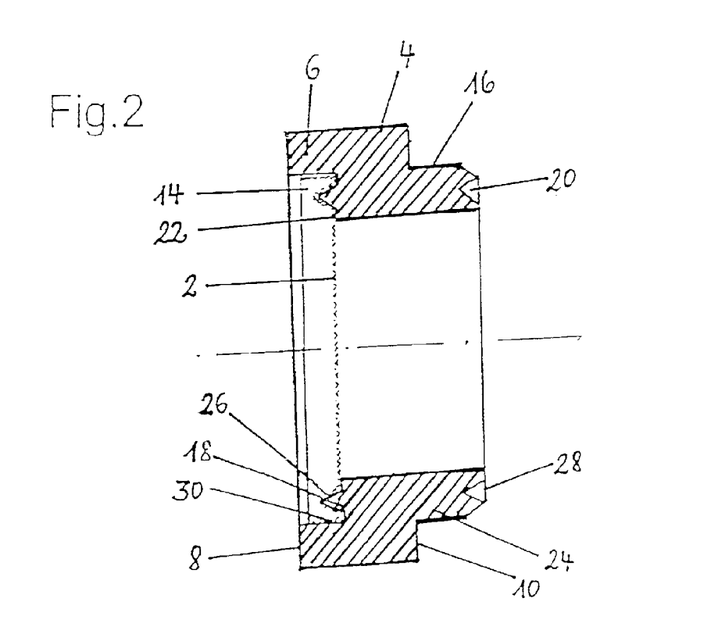
FIG. 2 is a section along the line II—II of the filter element according to FIG. 1.
Figure 3:
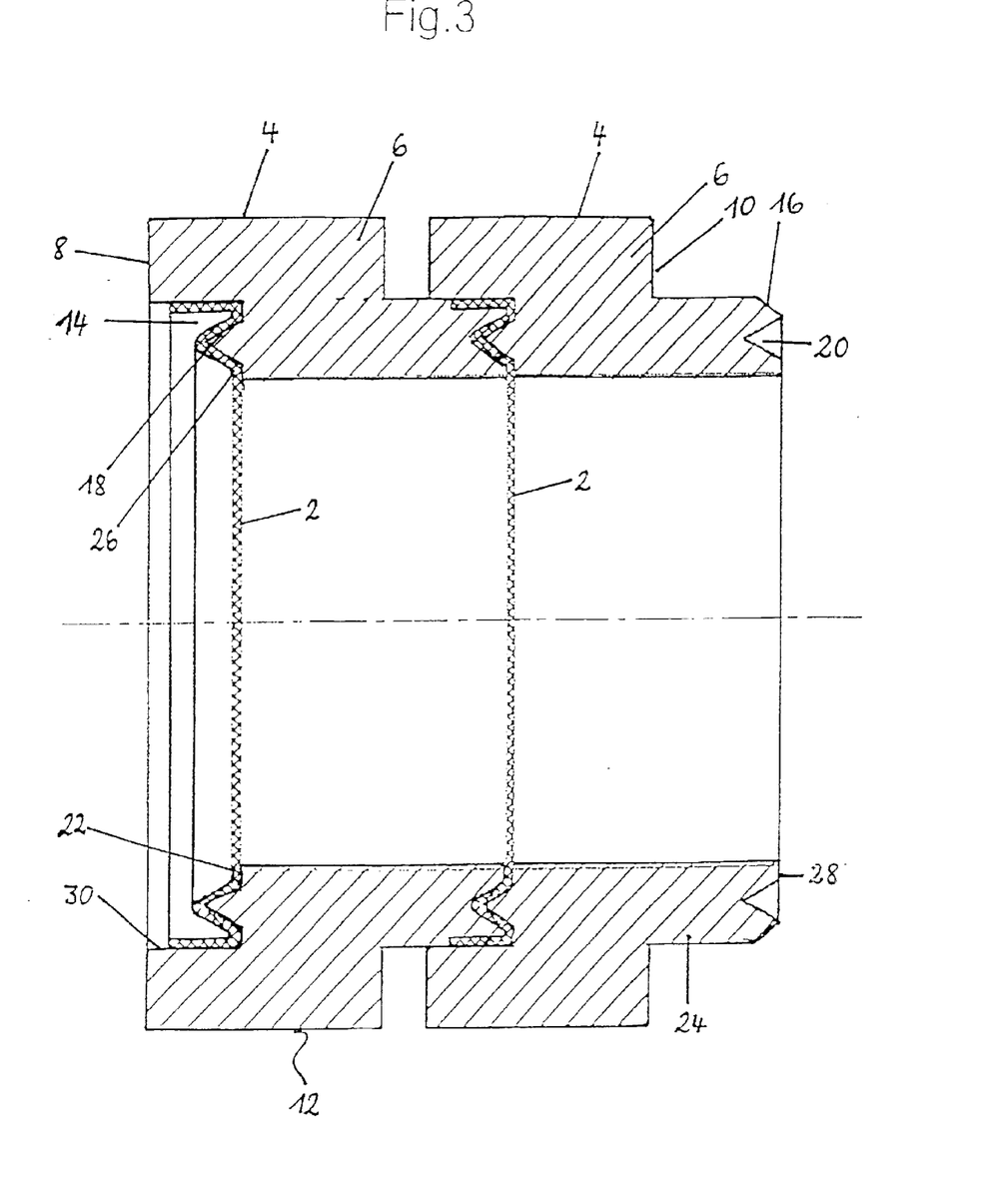
FIG. 3 is a cross-section in an enlarged scale showing two assembled filter elements according to FIGS. 1 and 2 for forming a combination filter assembly.

An important feature of the invention consists in the design of the filter elements 4, wherein reference is made to FIGS. 1 to 3.

As shown in these drawings, and in accordance with the present invention, each filter element 4 comprises a centering male coupling and sealing formation 14 on one of its bearing faces 8 or 10, and further comprises a corresponding female centering coupling and sealing formation 16 on the opposite bearing face 10 or 8, respectively. In the embodiment shown, the top bearing face 8 is provided with a centering male coupling sealing formation 14, while the bottom bearing face 10 is provided with a corresponding female centering coupling and sealing formation 16.

As can be particularly seen from FIGS. 1 and 2, the male coupling and sealing formation 14, which simultaneously performs a centering action, is provided by an annular protrusion 18 on the top bearing face 8. The matching female coupling and sealing formation 16 consists of a correspondingly shaped annular groove 20 in the bottom bearing face 10.

While any number of cross-sectional shapes can satisfy the desired purpose of the invention, in the preferred embodiment, the annular protrusion 18 and the annular groove 20 both have a V-shaped cross-section. This cross-sectional shape optimally fulfills the simultaneous function of centering the filter elements 4 with respect to each other.

As further can be discerned from FIGS. 1 and 2, the top bearing face 8 has an annular lowered step 22, while the bottom bearing face 10 has an annular boss 24 fitting into the step 22.

In the enlarged cross-sectional view according to FIG. 3, two filter elements are combined to form a combination filter assembly. The smallest exterior diameter of the boss 24 and the interior diameter of the step 22 are such that, in the position shown in FIG. 3, the fit between the exterior diameter of the boss 24 and the interior diameter of the step 22 forms a slight press fit. The annular protrusion 18 and the annular groove 20 each have a V-shaped cross-section so as to snugly fit into each other, and when combined with the slight press-fit between the exterior diameter of the boss 24 and the interior diameter of the step 22, the flow path formed as a result thereof is limited in such a way that the stack 12 of filter elements 4 does not allow any bypass of fluids.

In the embodiment shown, the annular protrusion 18 is positioned on the top side 26 of the step 22, while the annular groove 20 is positioned on the opposite top side 28 of the boss 24.

To enable a close compression of the filter elements 4 (i.e. to give the stack 12 a certain prestress loading in an axial direction), the height of the boss 24 is larger than the distance by which the step 22 is lowered with respect to the top bearing face 8.

As can be further discerned from FIGS. 1 to 3, the filter screen 2 is positioned over the annular protrusion 18 in each corresponding housing element 6 so as to partly cover the cylindrical wall 30 surrounding the step 22. This permits the filter screen 2, when assembling the stack 12, to be additionally secured by being clamped between the annular protrusion 18 and the annular groove 20, as well as between the boss 24 and the wall 30 of the step 22.

While, as mentioned above, the number of filter elements 4 in the stack 12 can be chosen freely and is virtually unlimited for the purposes described above, two to five filter elements 4 are preferably used in the combination filter assembly and are generally sufficient for most applications.

Figure 6:
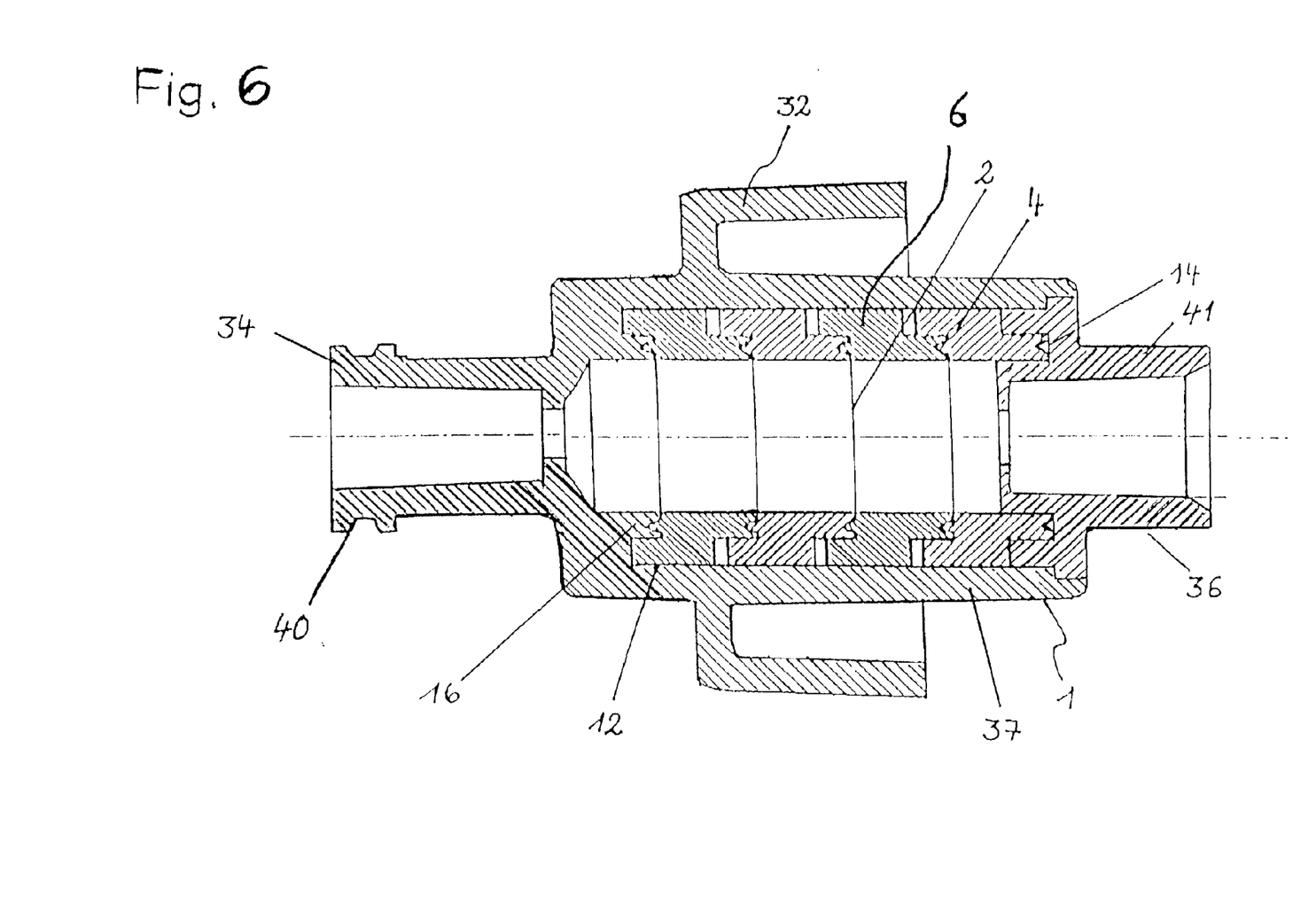
FIG. 6 is a cross-section of a first embodiment of a combination filter assembly according to the invention.

As can be discerned from the general representation according to FIG. 6, the filter elements 4 are positioned in a housing 32 as a coaxial column that, because of the excellent sealing between the individual filter elements, does not need to provide any sealing function. It should be appreciated that the dimensions chosen for the various components of the filter assembly are such that the filter elements 4 are positioned under an axial load in the housings 32 to obtain the optimal seal between the individual filter elements 4.

Figure 4:
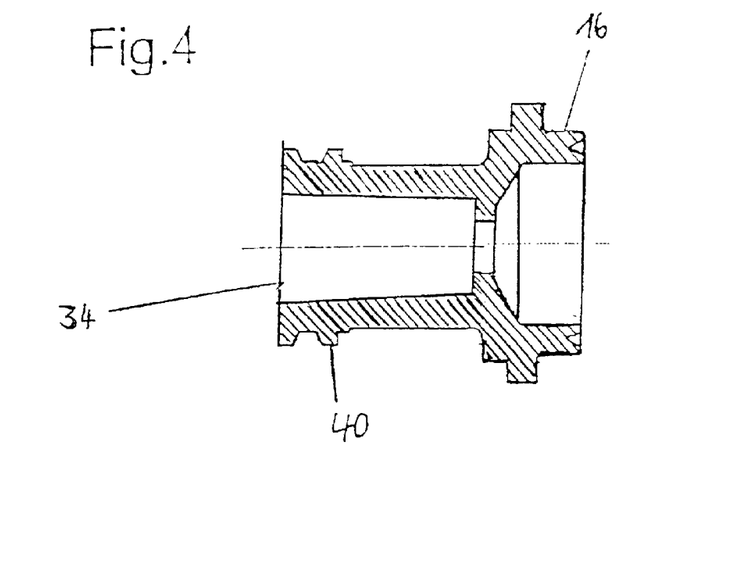
FIG. 4 is a cross-section of a suitable entry section for a combination filter assembly according to the invention.
Figure 5:
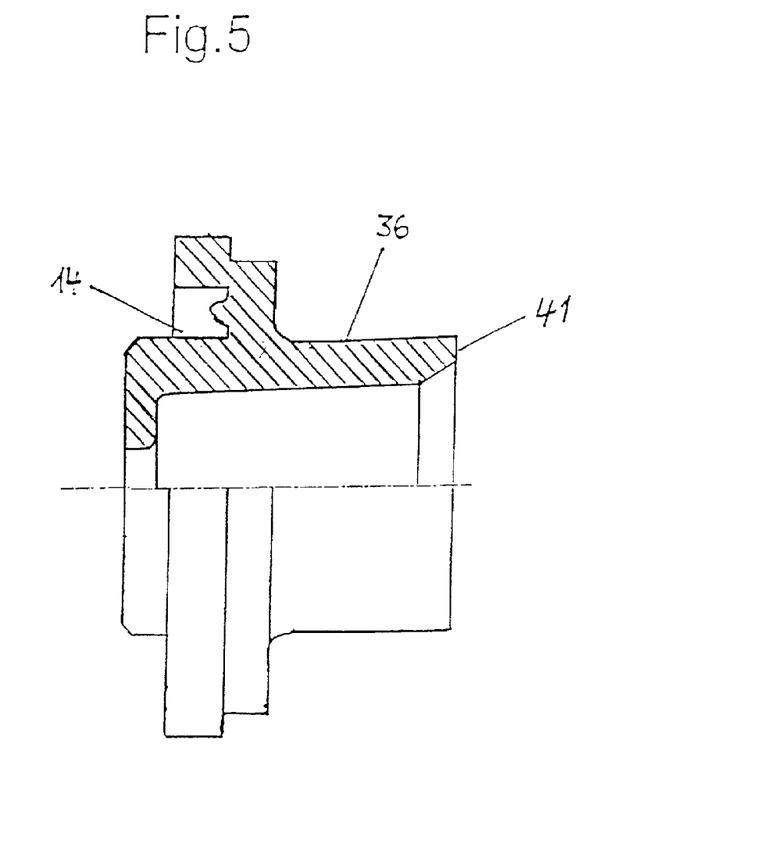
FIG. 5 is a cross-section enlarged with respect to FIG. 4, and showing an exit section suitable for a combination filter assembly according to the invention.

An additional feature on the present invention is in the specific design of the housing 32, which in all embodiments has at least an entry section 34 and an exit section 36, which are typically mounted axially in the direction of the central axis of the stack 12. FIG. 4 depicts such an entry section in cross-section, and FIG. 5 depicts a corresponding exit section 36 (in an enlarged scale as compared with FIG. 4). The embodiment shown in FIGS. 4 and 5 is used in the embodiment of the combination filter assembly according to FIG. 7, which is described in greater detail below.

In any event, in each of the embodiments described herein, the entry section 34 includes a female coupling and sealing formation 16 of the above described type, while the exit section 36 includes a corresponding male coupling and sealing formation 15, such that the entry section 34 and the exit section 36 can be added to opposite sides of the stack 12 of filter elements 4 in a similarly sealing fashion.

In the embodiment of the combination filter assembly 1 shown in FIG. 6, the entry section 34 has a unitary annular skirt 37, which completely receives the stack 12 of filter elements 4. The female coupling and sealing formation 16 provided on the entry section sealingly engages the male coupling and sealing formation 18 of the first filter element 4. At the opposite end of the stack 12, the exit section 36 is inserted into the annular skirt 37, and engages the female coupling and sealing formation of the last filter element 4 of the stack 12 with its male coupling and sealing formation 18.

For completing the combination filter assembly according to FIG. 6, the entry section 35 and the exit section 36 are axially compressed to provide a prestress in the stack 12 of filter elements 4 and thereafter, while maintaining the axial pressure, are joined with each other by ultrasonic welding or adhesion. At this point, for the sake of completeness it should be mentioned, that all component parts of the combination filter assembly 1 are comprised of suitable artificial resins or other materials.

Figure 7:
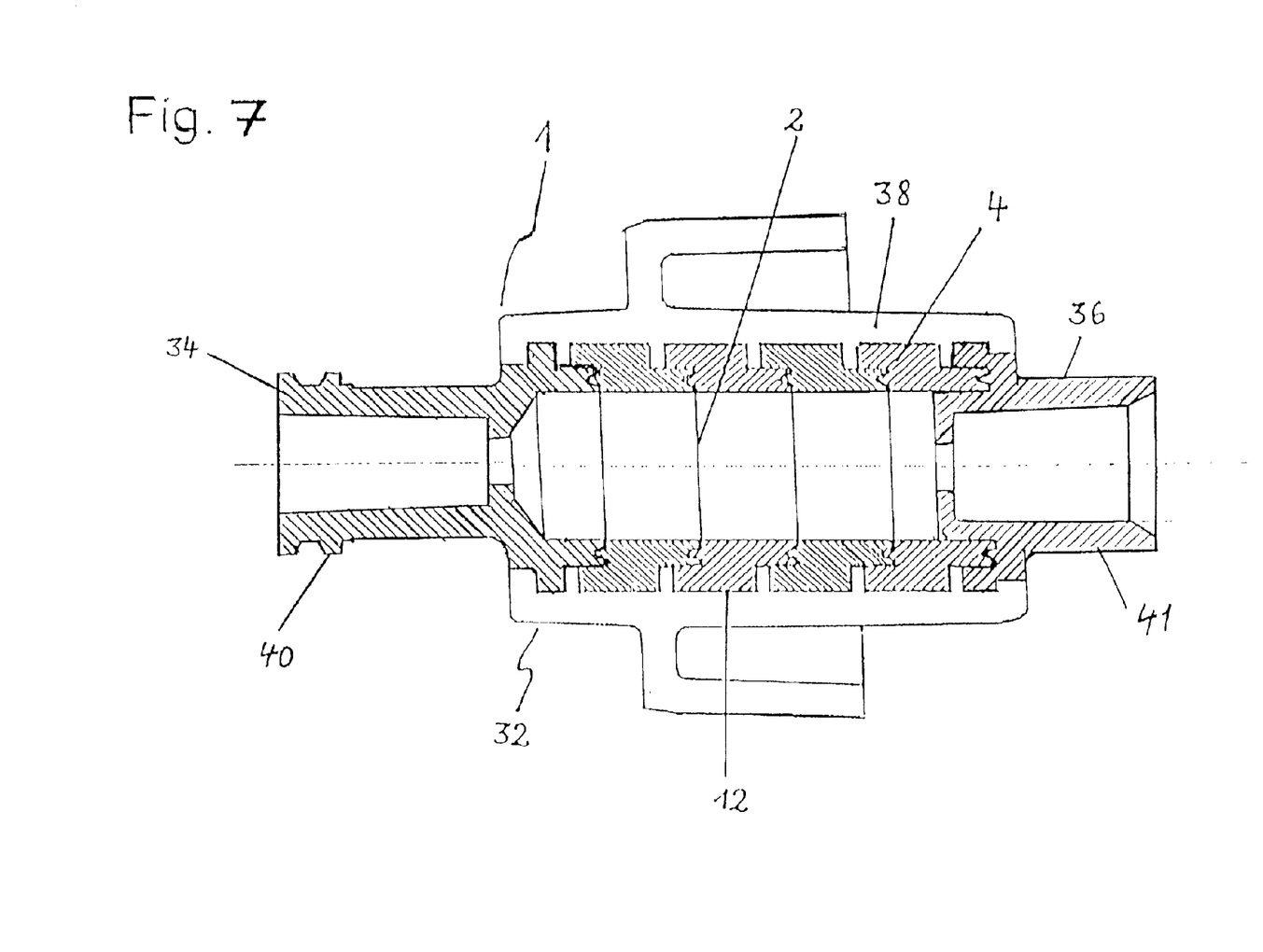
FIG. 7 is a cross-sectional view corresponding to FIG. 6 of a second embodiment of a combination filter assembly according to the invention.

The embodiment of the combination filter assembly 1 according to the invention shown in FIG. 7 is similar to the embodiment according to FIG. 6. However, in the combination filter assembly 1 according to the invention shown in FIG. 7, the housing 32 is produced by overmoulding. As a result of the centering and sealing action of the filter elements 4, it is possible to position the stack 12 of filter elements 4 between the entry section 34 (according to FIG. 4) and the exit section 36 (according to FIG. 6), and to load the unit formed thereby with an axial prestress. Thereafter, the column of filter elements 4, the exit section 36, and the entry section 34 are connected together by a cylinder section 38, which is produced by overmoulding the above components. The overmoulding can be done with the same artificial resin of which the filter elements 4 are comprised, or with a different artificial resin. It is also possible to choose an artificial resin for the cylinder section 38 which, after the overmoulding operation, slightly shrinks. In this way, the prestress in the stack 12 of filter elements 4 is produced and maintained.

Figure 8:
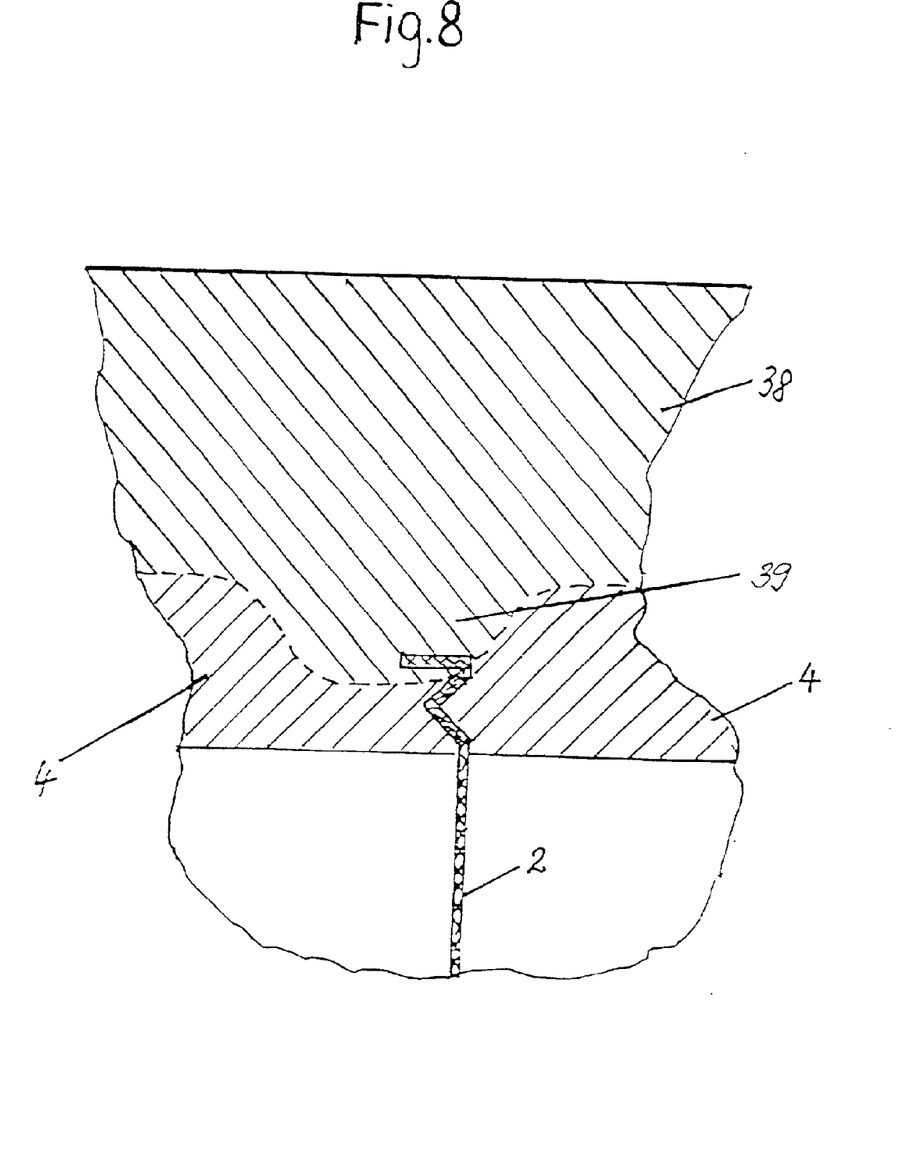
FIG. 8 is a cross-sectional view of a detail, showing a modification of the embodiment according to FIG. 7.

The overmoulding of the entry section 34, the stack 12, and the exit section 36 can also be controlled in such a way that the material of the housing elements 6 partly melting together with the material of the cylindrical section, thereby producing an unitary and completely sealed unit. To this end, and by way of example, the wall thickness of the housing elements 6 can be selected so that it comprises a small amount of material as compared with the amount of material of the cylinder section 38. This ensures that the joints between the filter elements 4 are melted together in a melting area 39. This is shown schematically in the detailed view according to FIG. 8, from which it can be discerned that, following the overmoulding operation, at least the step 22 and the boss 24 are partly melted together.

In a combination filter assembly 1 according to the present invention, the filter elements 4 of the stack 12 typically have the same mesh size. However, it is possible to have the filter elements 4 of a stack 12 with different mesh sizes to form, for example, a depth type filter.

In the preferred embodiments shown, the entry section 34 comprises a female Luer-Lock-connector 40, and the exit section 36 comprises a male Luer-Lock-connector 41. However, it should be appreciated that any number of connector designs could be incorporated into the combination filter assembly 1 of the present invention depending on the intended use of the device.

As already indicated above, the combination filter assembly 1 is preferably produced in such a way that the filter elements 4 are initially produced in a separate step by injection moulding the filter sieves 2 with the housing elements 6. In this step, the male coupling and sealing formations 14 and the female coupling and sealing formations 16 are simultaneously formed on the top bearing faces 8 and the bottom bearing faces 10, respectively, on each filter element. Thereafter, the desired or necessary number of filter elements 4 are positioned in a stack 12, wherein the male coupling and sealing formations 14 and the female coupling and sealing formations 16 on the opposite bearing faces 8 and 10 are engaged with each other. The column produced thereby is then positioned between the entry section 34 and the exit section 36, and is axially compressed. In this state, the entry section 34 is connected with the exit section 36.

Several methods can be utilized to achieve the connection of the entry section 34 with the exit section 36 with the interpositioned stack 12 of filter elements 4. In one alternative, a housing section is used, which by ultrasonic welding or adhesion, is connected with the entry section or the exit section, respectively.

In an alternative method of production, the stack 12 of filter elements 4 is positioned between the entry section 34 and the exit section 36 under pretension, and the unit created thereby is positioned in an injection moulding mould. Thereafter, the entry section, while maintaining the pretension, is connected with the exit section 36 by means of a cylinder section 38 formed by overmoulding. During this procedure, the wall thicknesses and/or the injection moulding temperature is chosen such that the material of the cylinder section 38 in a melting zone 39 is melted together with the material of the filter elements 4 or their housing elements 6, respectively.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are therefore to be considered in all respects only as illustrative and not restrictive, and the scope of the invention is, therefore, indicated by the appended claims rather than by the foregoing description. All changes that come within the meaning and range of equivalency of the claims are to be embraced within their scope.

What is claimed is:

1. A combination filter assembly having a number of filter sieves, said filter sieves being positioned in parallel one after the other in the direction of flow, wherein the filter sieves are stretched and mounted in housing elements to form filter elements, wherein the housing elements, by means of top and bottom bearing faces, are in contact with each other and are maintained in a stacked arrangement, wherein the filter elements each comprise a cylindrical shape with annular bearing faces, wherein each filter element on either its top or bottom bearing face comprises a centering male coupling and sealing formation, and on the other of its top or bottom bearing face comprises a corresponding centering female coupling and sealing formation, wherein the male coupling and sealing formation comprises an annular protrusion and the female coupling and sealing formation comprises a corresponding annular groove, and wherein the filter elements are positioned as a coaxial stack and are substantially enclosed within a housing.

2. The combination filter assembly according to claim 1, wherein the annular protrusion and the annular groove each have a V-shaped cross-section.

3. The combination filter assembly according to claim 1, wherein one of either the top or bottom bearing face further comprises an annular lowered step, and the other of the top or bottom bearing face further comprises an annular boss configured to fit into said step, wherein the fit between an exterior diameter of the boss and an interior diameter of the step is a slight press fit, that the male coupling and sealing formation is positioned on the top of the step, that the female coupling and sealing formation is positioned on the corresponding top of the boss, and that a height of the boss is larger than a depth of the step.

4. The combination filter assembly according to claim 1, wherein the filter sieve is positioned over the annular protrusion in the corresponding housing element and partly covers the cylindrical wall surrounding the step.

5. The combination filter assembly according to claim 1, wherein the combination filter assembly comprises two to five filter elements.

6. The combination filter assembly according to claim 1, wherein the filter elements are mounted in the housing with an axial load and, that the housing comprises an entry section and an exit section, said entry section and said exit section being mountable to each other in an axial relationship, wherein the entry section includes a female coupling and sealing formation and the exit section includes a male coupling and sealing formation.

7. The combination filter assembly according to claim 6, wherein the entry section is connected with the exit section while maintaining the axial load of the coaxial stack of filter elements by ultrasonic welding or adhesion.

8. The combination filter assembly according to claim 6, wherein the entry section is connected with the exit section while maintaining the axial load in the coaxial stack of filter elements by a cylinder section produced by overmoulding the entry and exit sections.

9. The combination filter assembly according to claim 8, wherein the cylinder section comprises an artificial resin that shrinks after overmoulding to produce said axial load in the coaxial stack of filter elements.

10. The combination filter assembly according to claim 8, wherein the housing elements have a wall thickness such that the material thereof is melted together with the material of the cylinder section during overmoulding.

11. The combination filter assembly according to claim 6, wherein the entry section comprises a female Luer-Lock connector.

12. The combination filter assembly according to claim 6, wherein the exit section comprises a male Luer-Lock connector.

13. The combination filter assembly according to claim 1, wherein the filter sieves of the plurality of filter elements each have the same pore size.

14. The combination filter assembly according to claim 1, wherein the filter sieves of the plurality of filter elements have different pore sizes so as to form a depth filter.

15. The combination filter assembly according to claim 1, wherein the filter sieves each comprise a filtering portion and an annularly disposed mounting portion, the mounting portion being substantially supported by the housing element, and the filtering portion being substantially unsupported by the housing element.

16. The combination filter assembly according to claim 15, wherein the filtering portion of the filter sieve is disposed within a single plane.

17. The combination filter assembly according to claim 15, wherein the filtering portion of the filter sieve comprises an area that is larger than that of the mounting portion.

18. A combination filter assembly having a number of filter sieves, said filter sieves being positioned in parallel one after the other in the direction of flow, wherein the filter sieves are stretched and mounted in housing elements to form filter elements, wherein the housing elements, by means of top and bottom bearing faces, are in contact with each other and are maintained in a stacked arrangement, wherein the filter elements each comprise a cylindrical shape with annular bearing faces, wherein each filter element on either its top or bottom bearing face comprises a centering male coupling and sealing formation, and on the other of its top or bottom bearing face comprises a corresponding centering female coupling and sealing formation, wherein the male coupling and sealing formation comprises an annular protrusion and the female coupling and searing formation comprises a corresponding annular groove, wherein the filter elements are positioned as a coaxial stack within a housing, that the filter elements are mounted in the housing with an axial load and, that the housing comprises an entry section and an exit section, said entry section and said exit section being mountable to each other in an axial relationship, and wherein the entry section includes a female coupling and sealing formation and the exit section is includes a male coupling and sealing formation.

19. The combination filter assembly according to claim 18, wherein the annular protrusion and the annular groove each have a V-shaped cross-section.

20. The combination filter assembly according to claim 18, wherein on of either the top or bottom bearing face further comprises an annular lowered step, and the other of the top or bottom bearing face further comprises an annular boss configured to fit into said step, wherein the fit between an exterior diameter of the boss and an interior diameter of the step is a slight press fit, that the male coupling and sealing formation is positioned on the top of the step, that the female coupling and sealing formation is positioned on the corresponding top of the boss, and that a height of the boss is larger than a depth of the step.

21. The combination filter assembly according to claim 18, wherein the filter sieve is positioned over the annular protrusion in the corresponding housing element and partly covers the cylindrical wall surrounding the step.

22. The combination filter assembly according to claim 18 wherein the combination filter assembly comprises two to five filter elements.

23. The combination filter assembly according to claim 18, wherein the entry section is connected with the exit section while maintaining the axial load of the coaxial stack of filter elements by ultrasonic welding or adhesion.

24. The combination filter assembly according to claim 18, wherein the entry section is connected with the exit section while maintaining the axial load in the coaxial stack of filter elements by a cylinder section produced by overmoulding the entry and exit sections.

25. The combination filter assembly according to claim 18, wherein the cylinder section comprises an artificial resin that shrinks after overmoulding to produce said axial load in the coaxial stack of filter elements.

26. The combination filter assembly according to claim 18, wherein the housing elements have a wall thickness such that the material thereof is melted together with the material of the cylinder section during overmoulding.

27. The combination filter assembly according to claim 18, wherein the entry section comprises a female Luer-Lock connector.

28. The combination filter assembly according to claim 18, wherein the exit section comprises a male Luer-Lock connector.

29. The combination filter assembly according to claim 18, wherein the filter sieves of the plurality of filter elements each have the same pore size.

30. The combination filter assembly according to claim 18, wherein the filter sieves of the plurality of filter elements have different pore sizes so as to form a depth filter.

31. A method for producing a combination filter assembly comprising a number of filter sieves that are stretched and mounted in housing elements to thereby form filter elements, said filter sieves being positioned in parallel one after the other in the direction of flow, said housing elements being positioned by means of top and bottom bearing faces in contact with each other so as to form a stack within a housing, wherein each filter element is provided with a centering male coupling and sealing formation on one of its bearing faces, and is provided with a centering female coupling and sealing formation on its opposite bearing face, said method comprising the steps of:
a) stacking the filter elements with interengaging male and female sealing formations to form a column;
b) positioning the column of filter elements between an entry section and an exit section;
c) axially compressing the column of fitter elements; and
d) connecting the entry section with the exit section via a housing section so as to enclose the filter elements.

32. The method according to claim 31, wherein the entry section is connected with the exit section via the housing section by means of ultrasonic welding or adhesion.

33. The method according to claim 31, wherein the entry section is connected with the exit section by overmolding.

34. The method according to claim 33, wherein the column of filter elements is positioned between the entry section and the exit section under a prehensile load, and wherein the entry section is connected with the exit section by means of a cylindrical section formed by overmoulding.

35. The method according to claim 34, wherein the wall thickness of the filter elements is chosen so that the material of the cylinder section is melted together with the material of the filter elements during overmoulding.

36. The method according to claims 34, wherein the wall thickness the housing elements is chosen so that the material of the cylinder section is melted together with the material of the housing elements during overmoulding.

37. The method according to claim 34, wherein the injection molding temperature is chosen so that the material of the cylinder section is melted together with the filter elements or the housing elements during overmoulding.

38. A method for producing a combination filter assembly comprising a number of filter sieves that are stretched and mounted in housing elements to thereby form filter elements, said filter sieves being positioned in parallel one after the other in the direction of flow, said housing elements being positioned by means of top and bottom bearing faces in contact with each other so as to form a stack within a housing, wherein each filter element is provided with a centering male coupling and sealing formation on one of its bearing faces, and is provided with a centering female coupling and sealing formation on its opposite bearing face, said method comprising the steps of:
a) stacking the filter elements with interengaging male and female sealing formations to form a column;
b) positioning the column of filter elements between an entry section and an exit section;
c) axially compressing the column of filter elements; and
d) connecting the entry section with the exit section via a housing section by means of ultrasonic welding or adhesion.

39. A method for producing a combination filter assembly comprising a number of filter sieves that are stretched and mounted in housing elements to thereby form filter elements, said filter sieves being positioned in parallel one after the other in the direction of flow, said housing elements being positioned by means of top and bottom bearing faces in contact with each other so as to form a stack within a housing, wherein each filter element is provided with a centering male coupling and sealing formation on one of its bearing faces, and is provided with a centering female coupling and sealing formation on its opposite bearing face, said method comprising the steps of:
a) stacking the filter elements with interengaging male and female sealing formations to form a column;

b) positioning the column of filter elements between an entry section and an exit section;

c) axially compressing the column of filter elements; and d) connecting the entry section with the exit section by overmolding.

40. The method according to claim 39, wherein the column of filter elements is positioned between the entry section and the exit section under a prehensile load, and wherein the entry section is connected with the exit section by means of a cylindrical section formed by overmoulding.

41. The method according to claim 40, wherein the wall thickness of the filter elements is chosen so that the material of the cylinder section is melted together with the material of the filter elements during overmoulding.

42. The method according to claim 40, wherein the wall thickness the housing elements is chosen so that the material of the cylinder section is melted together with the material of the housing elements during overmoulding.

43. The method according to claim 40, wherein the injection molding temperature is chosen so that the material of the cylinder section is melted together with the filter elements or the housing elements during overmoulding.

* * * * *

UNITED STATES PATENT AND TRADEMARK OFFICE
CERTIFICATE OF CORRECTION

PATENT NO.   : 6,846,412 B2
DATED        : January 25, 2005
INVENTOR(S)  : Brendan Hogan et al.

It is certified that error appears in the above-identified patent and that said Letters Patent is hereby corrected as shown below:

<u>Title page,</u>
Item [75], Inventors, add -- Anthony David Harman, Oxfordshire, United Kingdom --.
Item [*] Notice, should read -- (39 days) --.

Signed and Sealed this

Fourth Day of October, 2005

JON W. DUDAS
*Director of the United States Patent and Trademark Office*